United States Patent
Meir

(10) Patent No.: US 9,746,287 B2
(45) Date of Patent: Aug. 29, 2017

(54) STEALTH WINDOW

(71) Applicant: ELTICS LTD, Rishon Lezion (IL)

(72) Inventor: Ronen Meir, Ashkelon (IL)

(73) Assignee: ELTICS LTD, Rishon Lezion (IL)

( * ) Notice: Subject to any disclaimer, the term of this patent is extended or adjusted under 35 U.S.C. 154(b) by 28 days.

(21) Appl. No.: 14/370,972

(22) PCT Filed: Jan. 8, 2013

(86) PCT No.: PCT/IL2013/000002
§ 371 (c)(1),
(2) Date: Jul. 8, 2014

(87) PCT Pub. No.: WO2013/102896
PCT Pub. Date: Jul. 11, 2013

(65) Prior Publication Data
US 2015/0013228 A1  Jan. 15, 2015

(30) Foreign Application Priority Data

Jan. 8, 2012  (IL) .......................................... 217423

(51) Int. Cl.
*F41H 3/00* (2006.01)
*G02B 26/08* (2006.01)
*E05F 15/00* (2015.01)

(52) U.S. Cl.
CPC ............... *F41H 3/00* (2013.01); *E05F 15/00* (2013.01); *G02B 26/08* (2013.01)

(58) Field of Classification Search
CPC ..... F41H 5/18; F41H 5/26; F41H 3/00; F41H 5/2631; E05F 15/60; E05F 15/603

USPC ................................................. 49/61, 63, 67
See application file for complete search history.

(56) References Cited

U.S. PATENT DOCUMENTS

| | | | | |
|---|---|---|---|---|
| 3,559,528 A | * | 2/1971 | Cunningham | F41A 23/34 89/40.03 |
| 5,832,666 A | * | 11/1998 | Flack, II | E06B 9/04 49/339 |
| 6,338,292 B1 | * | 1/2002 | Reynolds | F41H 3/00 89/1.11 |
| 6,435,454 B1 | * | 8/2002 | Engelhardt | B64C 1/40 244/117 A |
| 6,753,075 B1 | * | 6/2004 | Leupolz | F41H 3/00 428/323 |
| 8,013,302 B2 | | 9/2011 | Meir | |
| 8,259,020 B1 | * | 9/2012 | Macy | H01Q 1/125 342/359 |
| 2007/0190368 A1 | * | 8/2007 | Jung | F41H 3/00 |

(Continued)

FOREIGN PATENT DOCUMENTS

| | | | |
|---|---|---|---|
| GB | 2 274 154 | * | 7/1994 |
| GB | 2274154 A | | 7/1994 |

*Primary Examiner* — Gregory Strimbu
(74) *Attorney, Agent, or Firm* — Deborah A. Gador

(57) ABSTRACT

A window in an asset having an active adaptive stealth system including a plurality of stealth plates whose temperature can be controlled to control an IR signature of the plates, the window including a window pane pivotally mounted in a wall of the asset adjacent the stealth plates, a motor drivingly coupled to the window pane, and a tilt mechanism coupled to the motor and arranged to position the window pane such that the IR signature of the stealth plates approximates an IR signature of the window pane.

14 Claims, 3 Drawing Sheets

(56) References Cited

U.S. PATENT DOCUMENTS

| | | | |
|---|---|---|---|
| 2009/0044694 A1* | 2/2009 | Allor | F41H 5/013 89/36.08 |
| 2010/0000231 A1* | 1/2010 | Meir | F41G 7/224 62/3.7 |
| 2012/0185109 A1* | 7/2012 | Olson | F41H 3/00 700/300 |

* cited by examiner

STEALTH WINDOW

RELATED APPLICATIONS

This application is a 35 USC §371 National Stage application of International Patent Application number PCT/IL2013/000002, having an international filing date of Jan. 8, 2013 (now pending), which claims the benefit of Israeli Patent Application No. 217423 filed on Jan. 8, 2012. The disclosure of each of the prior applications is considered part of and is incorporated by reference in the disclosure of this application.

FIELD OF THE INVENTION

The present invention relates to windows, in general and, in particular, to a stealth window for use in a camouflaged object.

BACKGROUND OF THE INVENTION

Stealth is a known term for low absorbability, or invisibility in the radar world and also invisibility to thermal imaging detection and observation, such as described, for example, in Eltics Ltd.'s U.S. Pat. Nos. 8,013,302 and 8,080,792, the disclosures of which are incorporated herein by reference in their entirety. These patents describe and claim an active adaptive stealth system made from active stealth plates that, inter alia, generate the same signature as the surroundings and blend into the background to become invisible to thermal cameras or thermal sights, for military purposes.

A disadvantage of the present system is that, although the plates become thermally equal to the background, any uncovered window panes remain with a significant signature—usually a negative signature from reflecting the cold sky. This signature does not match the background or the surroundings and, as such, the window can be detected by thermal sensors, such as thermal cameras and thermal sights. This, therefore, will decrease stealth performance of an asset (an object being protected) having uncovered windows.

An important factor is that the user of the assets wants to have a window to look out from, for the purpose of situation awareness of the battlefield, driving ability—with or without the aid of night vision goggles, known as NVG—and to reduce the claustrophobic psychological feel of the user.

Accordingly, there is a long felt need for a window for camouflaged assets, or any other portion of an asset that cannot be covered by plates, that can also be camouflaged, and it would be very desirable if such a stealth window could still be used for viewing through at the time it is camouflaged.

SUMMARY OF THE INVENTION

The present invention relates to a stealth window for use in a camouflaged asset, which provides stealth to the window itself. For purposes of this application, the invention will be described as a stealth window, however, the invention relates not only to glass or transparent window panes, but also to any other surface of an asset that cannot be covered by active stealth plates without interfering with its normal usage.

Thus, there is provided, according to the present invention, a window in an asset in an active adaptive stealth system, the window including a pivotally mounted window pane pivotally mounted in the asset, a motor drivingly connected to the window causing the window pane to tilt relative to the asset, and a tilt control mechanism controlling the motor to change the tilt position of the window pane relative to the ground to approach a best match of an IR signature of the window with the stealth plates.

According to some embodiments, the window pane is mounted in an enclosure and an additional window pane is fixed in the enclosure to prevent escape of radiation from inside the asset via the edges between the pivotal window pane in a tilt position and the asset.

According to embodiments of the invention, the window further includes a motor control circuit coupled to the motor and a CPU processor of an active adaptive stealth system is controllingly coupled to the motor control circuit. In this case, the processor receives data of the temperature of the stealth plates and activates the motor to tilt the window according to the received data.

A thermal sensor may be mounted on the window pane to detect thermal radiation at a selected angle, such as 90 degrees, to the window pane. This thermal sensor would be coupled to the CPU and provide a signal corresponding to the thermal radiation at that angle to the CPU for calculating ground temperature and controlling the motor to change position for best match to the IR signature of the stealth plates.

There is further provided, according to the invention, a method for providing active adaptive stealth to a window in an asset in an active adaptive stealth system having stealth plates mounted adjacent the window, the method including calculating data in a CPU regarding temperature of the stealth plates, tilting a window pane pivotally mounted in the asset, in accordance with the calculated data, to a tilt position providing an IR signature to the window pane that is a best match to an IR signature of the stealth plates, to provide active adaptive stealth for the window.

According to embodiments of the invention, the step of tilting includes drivingly connecting a motor to the window pane, and controlling the motor to change a tilt position of the window pane relative to the ground to obtain a best match of reflectance from the window with the IR signature of the stealth plates. A motor control circuit can be coupled to the motor, and a CPU processor of an active adaptive stealth system controllingly coupled to the motor control circuit. The method further includes receiving, in the processor, data of temperature of the stealth plates, and activating the motor to tilt the window according to the received data.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to an active stealth window that overcomes the window's thermal signature problem created by the thermal signature of the sky. This is accomplished by mounting a tiltable window pane in an enclosure of the asset to be camouflaged, and tilting the window pane to obtain a desired apparent thermal signature.

Figure 1:
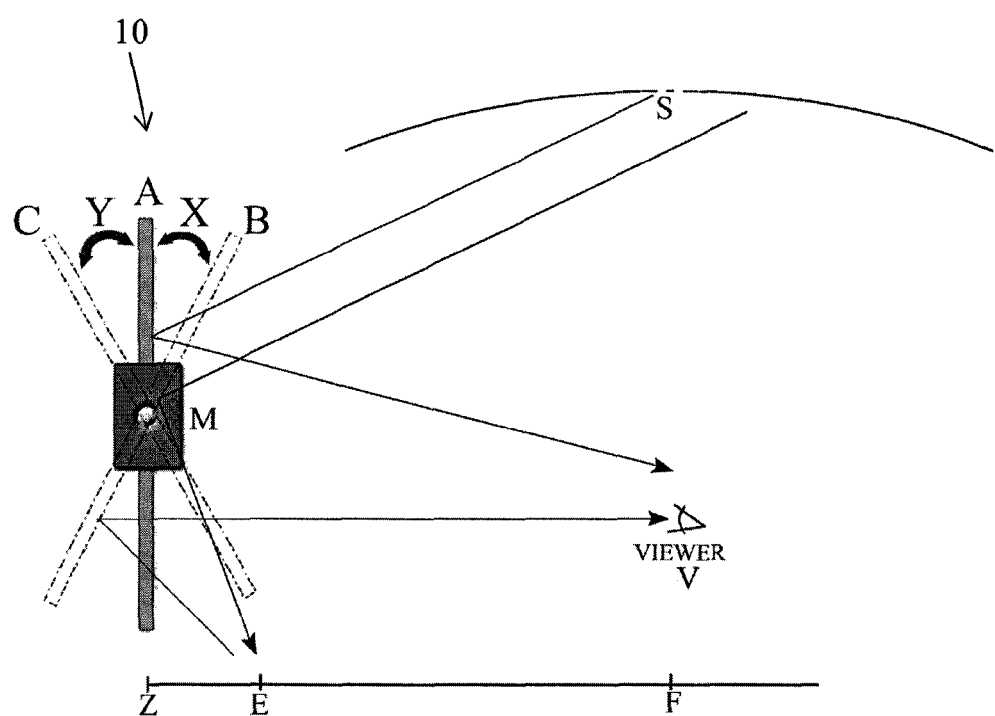
FIG. 1 is a schematic illustration of a stealth window constructed and operative in accordance with one embodiment of the present invention.

Referring to FIG. 1, there is shown a stealth window 10 constructed and operative in accordance with an embodiment of the present invention. Stealth window 10 includes a pivotal window pane A connected to a motor M that can be controlled to change the window's tilt position. Window pane A can be a glass or transparent window pane or any other surface that cannot be covered by stealth plates without interfering with its normal usage. Three tilt positions are illustrated: where the window pane A is substantially perpendicular to the ground, tilt position B (tilted through an angle X), facing towards the ground near the window, and tilt position C (tilted through an angle Y), facing the sky. Motor M can cause window pane A to tilt to any one of these positions or to any tilt position or angle between B and C. When an observer, particularly the enemy, is looking in the direction of the window and the window pane A stands straight (no tilt), pointing to a point Z on the scale of FIG. 1, the window pane then will reflect the IR signature (negative temperature radiation) from the cold sky S. This creates a difference between the window pane's apparent temperature, and the background temperature that is copied by the active stealth plates on the asset, which will create an image of the window at viewer V, who is using a thermal sensor.

When window pane A changes its position to tilt position B, e.g., with the aid of the motor M, it is now facing the ground near the protected asset to a point E on the scale of FIG. 1, and therefore will reflect the IR signature of the ground and not of the sky. As the ground temperature is of significantly better match with the background than the sky, the IR signature of the window pane now becomes closer to the IR signature of the stealth plates and does not stand out. As a result—the window will become less visible to thermal sensors at a distance F, such as viewer V, providing stealth to the window and to the entire asset.

Figure 2:
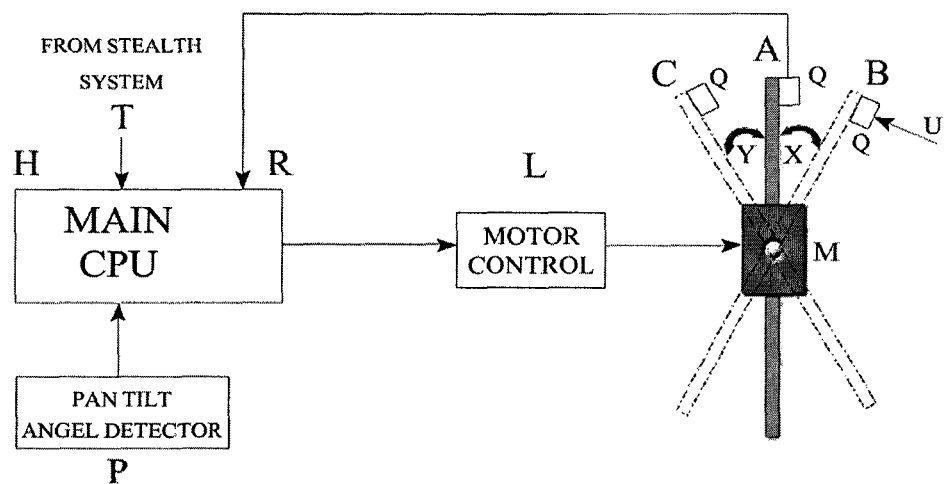
FIG. 2 is a schematic illustration of the stealth window of FIG. 1 with computer controls, according to one embodiment of the invention.

Referring to FIG. 2, there is shown an example of stealth window 10 incorporated in an active adaptive stealth system. Window pane A is pivotally mounted about an axis and coupled to the motor M that is controlled by a motor control circuit L (e.g., a stepper motor, servo motor or other). The main CPU processor H of the active adaptive stealth system maintains the window pane angle at a fixed angle relative to the ground, even if the whole platform changes in angle. This is achieved by sensing the platform angle with a pan tilt or other angle detector P, as shown in FIG. 2. Alternatively, the window pane can be mounted on a device (not shown) providing pan and/or tilt of the window, the pan/tilt device being controlled by the CPU. The CPU receives information of the platform angle from an angle sensor and actuates the motor to maintain the tilt position of the window pane at a fixed angle to the ground, even if the platform position changes.

The CPU H also receives data T from temperature sensors sensing the temperature of the stealth plates, or uses the temperature set by the CPU for the plates adjacent the window. In response to this calculation, if required, the CPU causes motor M to rotate the window pane slightly, to a position providing a better match with the IR signature of the plates.

Alternatively, the CPU H may accept data from the platform stealth system, or from a thermal sensor or thermal camera that senses the background radiation behind the asset. Using this data, the CPU calculates the background radiation value (or temperature). In response to this calculation, if required, the CPU causes motor M to slightly rotate the window pane, that is now at the B tilt position, to a better position, i.e., that has better match with the background IR signatures. The data of the best ground temperature U may be taken, for example, from a small thermal sensor Q coupled to the window pane, as shown in FIG. 2. Sensor Q preferably is mounted on window pane A at a pre-selected angle, typically 90 degrees. This sensor, which may be, for example, a heat tracer gun, measures the ground temperature at close proximity to the asset and transmits the data back to the CPU H at input R. This adjustment may occur dynamically over time, as the ground temperature changes.

In some cases where a negative temperature is wanted, like in snow or near a lake that also reflects the sky (i.e., the background temperature is colder than the ground), the window pane will now rotate toward the sky, e.g., to tilt position C, to look for a best IR signature match. Sensor Q, with CPU H, also will look for a best match by adjusting the tilt position of the window pane to the best angle that equals or approximates the IR signature of the plates adjacent the window. In this way, the asset can blend with an asset against a negative cold background, as well.

Figure 3:
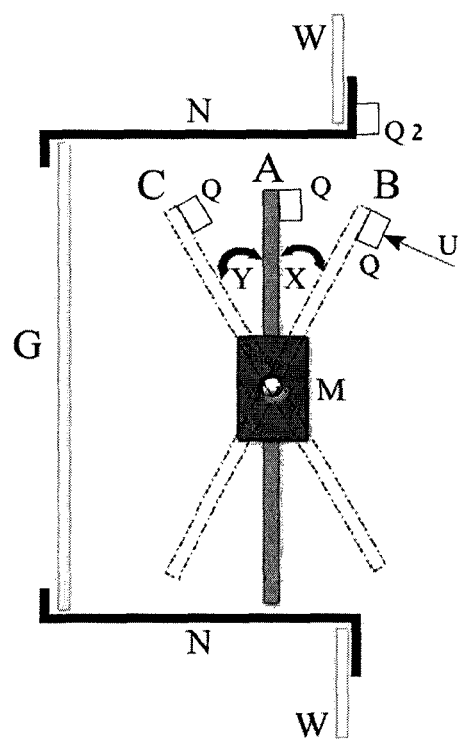
FIG. 3 is a block diagram illustration of the stealth window of FIG. 1, mounted in a window frame.

FIG. 3 illustrates the whole stealth window, with a rotating window pane A in an enclosure (window frame) N. Preferably, a second, fixed, window pane G, is also provided in enclosure N to block any thermal radiation from inside the asset that may escape from the edges between enclosure N and window pane A at any tilt position. Window pane G is preferably of insulating material, and may be transparent. The enclosure is attached to the asset W. Asset W can be a car, jeep, tank, APC, building, or any other platform, including stationary platforms. An additional sensor Q2 may be provided on the enclosure N. The window pane may have a wiper on it to keep it clear and reflective.

Figure 4:
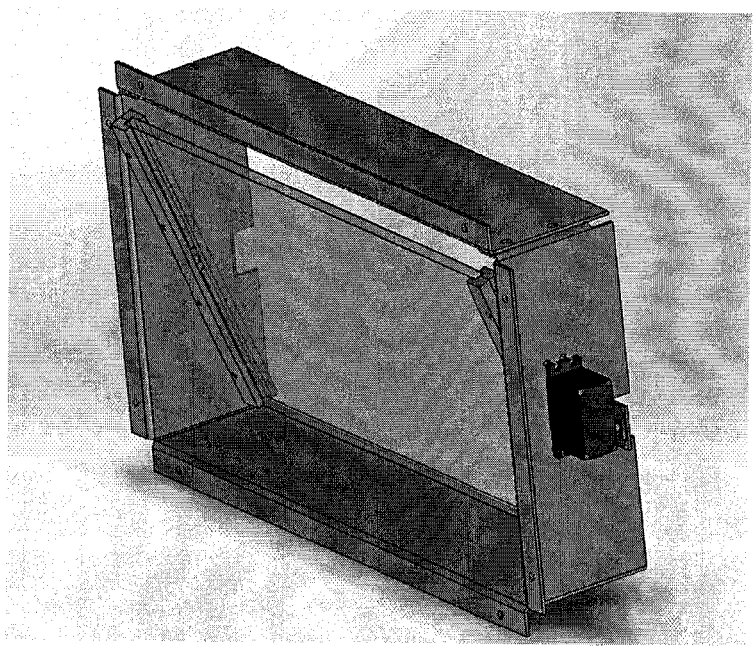
FIG. 4 is a schematic perspective view of the stealth window of FIG. 3.

FIG. 4 illustrates the general look of an exemplary stealth window and enclosure, according to one embodiment of the invention.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A window in an asset having an active adaptive stealth system having a plurality of stealth plates whose temperature can be controlled to control an IR signature of the plates, the window comprising:
   a window pane pivotally mounted in a wall of the asset adjacent said stealth plates;
   a motor coupled to said window pane for tilting said window pane relative to the asset; and
   a tilt mechanism including a CPU, the tile mechanism coupled to the motor and arranged to receive data corresponding to the IR signature of the stealth plates and calculate a tilt position of the window pane where an IR signature of the window pane approximates the IR signature of the stealth plates;
   the tilt mechanism controlling the motor to rotate the window pane into said tilt position such that the IR signature of the window pane approximates the IR signature of the stealth plates.

2. The window according to claim 1, further comprising:
   an enclosure;

said window pane pivotally mounted in said enclosure; and a fixed pane of glass mounted in said enclosure a distance from the window pane to prevent escape of IR radiation from inside the asset between the enclosure and the window pane when the window pane is in the tilt position.

3. The window according to claim 2, further comprising:

a motor control circuit coupled to said motor;

wherein said CPU is controllingly coupled to said motor control circuit, said CPU receiving said data and activating said motor to rotate said window pane into said tilt position according to said data.

4. The window according to claim 3, further comprising an angle sensor determining an angle of the asset relative to the ground; and wherein said CPU actuates said motor based on said angle to maintain the tilt position of the window pane at a fixed angle relative to the ground.

5. The window according to claim 4, further comprising:

a thermal sensor mounted on said window pane, wherein said CPU calculates a temperature of the ground based on information from the thermal sensor and controls said motor to rotate the window pane into the tilt position.

6. The window according to claim 3, wherein said tilt mechanism also controls a pan of the window pane.

7. The window according to claim 3, further comprising:

a thermal sensor mounted on said window pane, wherein said CPU calculates a temperature of the ground based on information from the thermal sensor and controls said motor to rotate the window pane into the tilt position.

8. The window according to claim 1, further comprising:

a motor control circuit coupled to said motor; and wherein said CPU is controllingly coupled to said motor control circuit, said CPU receiving said data corresponding to said IR signatures of the stealth plates and activating said motor to rotate said window pane into said tilt position according to said data.

9. The window according to claim 8, further comprising an angle sensor determining an angle of the asset relative to the ground; and wherein said CPU actuates said motor based on said angle to maintain the tilt position of the window pane at a fixed angle relative to the ground.

10. The window according to claim 9, further comprising:

a thermal sensor mounted on said window pane, wherein said CPU calculates a temperature of the ground based on information from the thermal sensor and controls said motor to rotate the window pane into the tilt position.

11. The window according to claim 9, wherein said tilt mechanism also controls a pan of the window pane.

12. The window according to claim 11, further comprising:

a thermal sensor mounted on said window pane, wherein said CPU calculates a temperature of the ground based on information from the thermal sensor and controls said motor to rotate the window pane into the tilt position.

13. The window according to claim 9, wherein said tilt mechanism also controls a pan of the window pane.

14. The window according to claim 8, further comprising:

a thermal sensor on said window pane, wherein said CPU calculates a temperature of the ground based on information from the thermal sensor and controls said motor to rotate the window pane into the tilt position.

\* \* \* \* \*